March 18, 1969     L. J. FOX     3,433,261

FLOW CONTROL DEVICE

Filed Feb. 21, 1967

INVENTOR
LESTER JOHN FOX

BY *Browne, Schuyler & Beveridge*

ATTORNEYS

United States Patent Office 3,433,261
Patented Mar. 18, 1969

3,433,261
FLOW CONTROL DEVICE
Lester John Fox, Glen Allen, Va., assignor to Eskimo Pie Corporation, Richmond, Va., a corporation of Delaware
Filed Feb. 21, 1967, Ser. No. 617,636
U.S. Cl. 137—608         8 Claims
Int. Cl. A23g 5/02

ABSTRACT OF THE DISCLOSURE

A flow control and manifold device for controlling the divided flow from a main feed line utilizing a plurality of tubular T's, each having one end connected into a length of feed pipe at spaced intervals with a cylindrical plug being insertable into an open end of a cross member of each T with each plug of a length that the tip of the innermost end extends past the stem member of the T and the inner end portion of at least one of the plugs being cut obliquely to the plug axis to present a restriction in the T which is variable according to the rotative position of the plug.

---

This invention relates to a device which divides and controls the flow of material from a main feed line among several branch lines, particularly useful in controlling the flow of frozen dessert mixtures in a plastic, flowable state through multiple feed lines from which the mixtures are discharged and formed into shapes which are frozen to a solid form.

In the large scale production of frozen confections, the mixture is initially prepared in a cold, flowable plastic state and flows under pressure through a main feed line to nozzles or other discharging means where the flowable mixture is discharged into shaped molds or extruded and cut into lengths, which are subsequently frozen to a solid state. The flow of the dessert mixture in the main feed line must often be diverted into separate and small lines which feed the mixture to the individual dispensing nozzles. The flow in each of the small, individual lines requires control through some simple valving device.

As noted in U.S. Patent 3,196,809, which discloses an extrusion nozzle for frozen desserts in which the frozen dessert flows through three individual lines for discharge into various portions of the nozzle, machinery for handling edibles must meet standards of cleanliness set down by health boards and commissions of the states and local municipalities. Apparatus containing dead-end areas, internal wells, recesses and other structure which causes the food to collect will not meet the stringent standards of these various health boards and commissions. The machinery utilized to carry and handle foods must be of a simple construction with open, straight through passages and parts which can be easily dismantled and completely cleaned. The conventional manifolding arrangements with separate valves in the individual lines do not meet the strict requirements established by the health boards and commissions relating to ease of disassembly and thorough cleaning. Conventional valves and manifolds contain areas where the food tends to collect and which are hard to clean.

Accordingly, the main object of this invention is to provide a flow control or manifolding device which is simple in construction, can be easily disassembled and contains straight passages and surfaces free of recesses which can be easily and readily cleaned and sterilized.

This object has been achieved through utilizing a straight length of feed pipe into which are connected an end of each of a plurality of tubular T's at spaced intervals. A plastic plug of basic cylindrical cross section and tightly fitting within the top cross member of each T is insertable into the cross member and retained in the fully inserted position by means of a rod inserted through holes in the T's and engaging in a circumferential groove near the outer end portion of the plug. Two types of plugs are utilized. The first is a stop plug which is a cylindrical plug extending past the connection in the T to the central stem member. The other type of plug is a flow control plug in which the far tip of the plug, which protrudes furthermost into the T cross member, extends past the connection between the cross member and the central stem member of the T but the far end of the plug is obliquely cut transversely so that a varying portion of the sidewall of the plug lies across and blocks the passage connecting the cross member to the central stem member, dependent upon the rotational position of the plug. The plugs are retained in the fully inserted position by means of a straight rod which projects through the outer flange portion of the cross member of each T and engages in a circumferential groove cut around each plug, thereby permitting the plugs to be rotated about their axes while retained in the fully inserted position. The two types of plugs are interchangeable and easily removed by withdrawing them from the T. The flow through any individual feed line of the manifold can easily be controlled by utilizing one of the obliquely cut plugs and rotating the plug to a position such that the desired flow is obtained through the T or, if the individual feed line is to be blocked, a blocking plug is utilized in which the far end is cut normal to the plug axis rather than obliquely. A sealing gasket engaging in a ircumferential groove of the plug is utilized to ensure a tight seal.

For a better understanding of the invention reference is now made to a preferred embodiment shown in the accompanying drawings of which:

Figure 1:
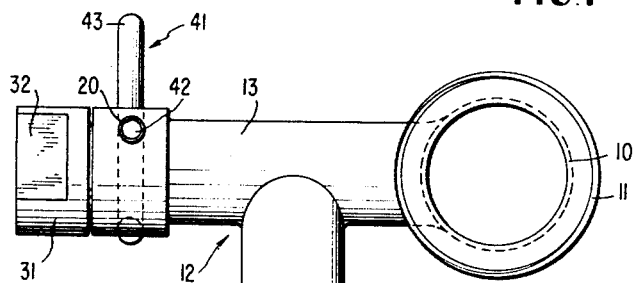
FIGURE 1 is an end view of the device as seen from the right hand end of FIGURE 2.

The main feed pipe of the manifolding device is a straight length of pipe 10 with screw threads 11 at either end by which the pipe may be incorporated into the main feed line of the system by means of a union. A plurality of hollow tubular T's 12, which have a cross member 13 and stem member 14 connected into the cross member 13 intermediate its ends each have one end 16 connected into the main feed pipe 10 at spaced intervals along its length, the cross members 13 of the T's being normal to the axis of the main feed pipe and juxtaposed to lie in a plane parallel to the axis of the main feed pipe. The other end 17 of the cross member 13 of the T is open, as is the lower end 18 of the stem member 14.

The outer open end 17 of the cross member 13 is circumscribed by a flange 19 of thicker gage than the remaining wall area of cross member 13. A hole 20 is drilled through the top portion of the flange 19 of each cross member with the top portion of the hole slightly below the top edge of the flange 19 and with the axes of the holes 20 parallel to the longitudinal axis of the main feed pipe 13. The lower open end 18 of the stem member 14 is shown to have a plain, cut-off end but obviously could be flanged or could include a fitting for attachment to another line or device. Although the preferred embodiment shows the end 16 of the T cross member 13 as being connected into the main feed pipe 10, the open end 18 of the stem member 14 could be connected into the main feed pipe 10 to leave the end 16 of the T cross member 13 open. The bore 21 of the T cross member 13 is cylindrical and is conveniently of the same diameter as the bore 22 of the stem member 14. The bore 23 of the main feed pipe 10 is usually larger than each bore of the tubular T 12 as it carries a larger volume of material.

Figure 3:
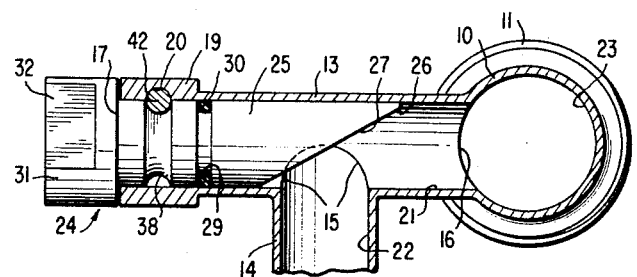
FIGURE 3 is a cross sectional view along section 3—3 of FIGURE 2 and illustrates a control plug.
Figure 2:
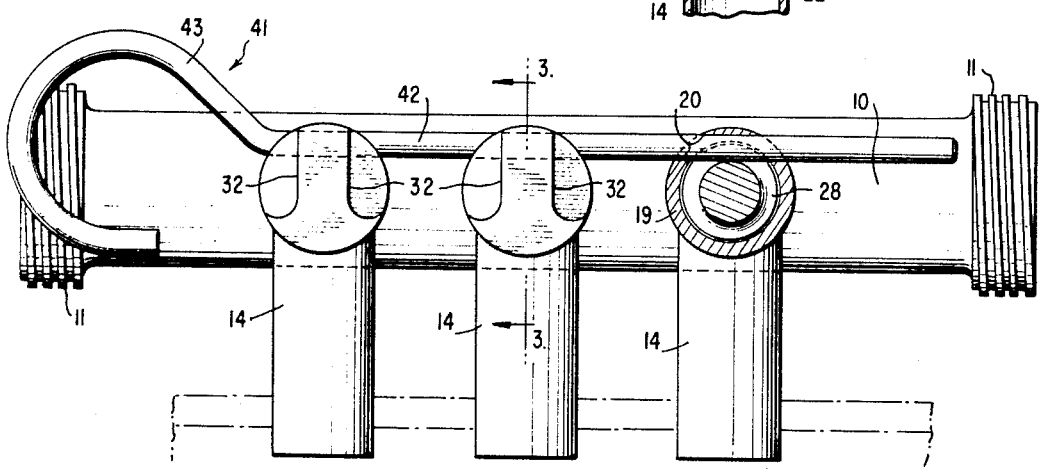
FIGURE 2 is a side view of the device as seen from the left hand side of FIGURE 1, one portion being partially in section.

Two types of plugs are insertable into the cross members 13 of each T 12 through the open end 17. The first type of plug is a control plug 24 illustrated in FIGURE 3. The end portion 25 of the plug insertable into the cross member 13 is formed from a cylindrical segment and is of such a length that the furthermost tip end 26 extends beyond the bore 22 of the stem member 14 toward the feed pipe 10. However, the far end of the plug at this furthermost tip is obliquely cut transversely in a flat plane 27 at an angle of approximately 30° to the axis of the plug so as to establish a restriction in the passage 15 between the cross member 13 and the stem member 14 which is variable in accordance with the rotative position of the plug 24 in the T cross member 13. In the position illustrated in FIGURE 3, the restriction in minimal but the restriction increases to a maximum as the plug is rotated through 180°. Near the outer end of that portion 25 of the plug within the T and in line with the hole 20, the plug is circumscribed by a groove 28 in which the groove conforms to the lower portion of the hole 20. That inner portion of the plug 25 between the groove 28 and the oblique face 27 is circumscribed by a small groove 29 into which a sealing gasket 30 is inserted to provide a tight seal and prevent leakage of material through the open end 17 of the cross member 13. An outer portion 31 of the plug, which lies outside the end 17 of the T cross member 13 when the plug is fully inserted, is larger in diameter than the bore 21 of the cross member 13 and carries two recesses 32 on either side which extend partially across the diameter of the plug with the adjacent, inner side of the respective recesses being parallel and normal to the oblique face 27 of the plug to indicate the position of that face. These recesses also provide a ready means for grasping and turning the plug 24 to position it in the desired rotative position. The plug is made from nylon.

Figure 4:
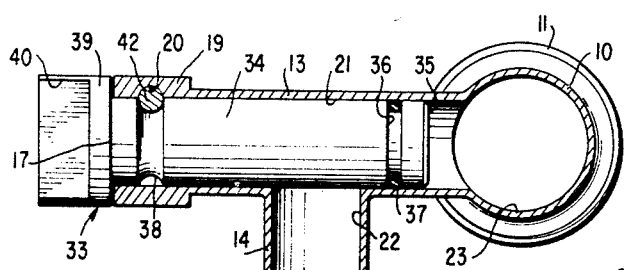
FIGURE 4 is a sectional view similar to FIGURE 3 illustrating a cut-off plug.

The other type of plug is a cut-off plug 33 illustrated in FIGURE 4. The segment 34 of the plug within the T cross member 13 is a cylindrical section approximately the same diameter as the bore 21 of the cross member 13 and is of a length that the far tip end 35 extending furthermost into the interior of the T cross member 13 lies beyond the bore 22 of the T stem member 14 on the side of the pipe 10. However, in the case of the cut-off plug, the innermost end 35 is cut transversely, normal to the plug so that the tube completely blocks the connecting passage 15 between the cross member 13 and the stem member 14. A groove 36 circumferential of the plug and located between the stem member 14 and the innermost tip 35 of the plug contains a sealing gasket 37 to seal the passage and prevent the entry of material into the T stem member 14. As in the case of the control plug, a circumferential groove 38 circumscribes the portion of the plug lying in line with the hole 20 in the flange of the T cross member 13. Again, as in the case of the control plug, the outer segment 39 of the plug external of the cross member 13 is of a larger diameter than the bore 21 of the cross member. Two opposing recesses 40 are cut across the entire diameter of the outer end 39 of the plug to permit the plug to be grasped and withdrawn from the T. The shape of these recesses also identifies the plug as a cut-off plug.

A locking rod 41, having a straight section 42 and an end portion 43 formed into a curved section, provides the means for retaining the plugs in the fully inserted position. The straight segment 42 of the locking rod 41 is inserted into the holes 20 of the cross members when the plugs are fully inserted and the engagement of the rod in the grooves 28 or 38 of the plugs will retain them in the fully inserted position. However, the plugs locked into position by means of the locking rod 41 may be rotated about their longitudinal axis so that each control plug 24 can be rotatively adjusted to that position which establishes the desired flow through each T.

As can be readily appreciated from viewing the drawings, the manifold and control device comprises straight tubular sections which can be readily and easily cleaned and replaceable plugs of simple structure which are readily withdrawn and easily cleaned. The entire device contains no recesses and areas in which food particles will tend to collect and makes cleaning difficult. The segments of the tubular T's and main feed pipe to be joined may be welded together by external wells, leaving the inner surfaces smooth and free of voids.

While the above describes and illustrates a preferred embodiment of the invention, it should be understood that the invention is not restricted solely to the described embodiment but that it covers all modifications which should be apparent to one skilled in the art and which would fall within the scope and spirit of the invention.

What is claimed is:

1. A manifolding flow control device comprising:
   a length of feed pipe,
   a plurality of tubular T's, each having a cross member with a cylindrical inner bore and a stem member connecting to the cross member intermediate its ends,
   said T's connecting at one end into the bore of said pipe at spaced intervals along its length with the other two ends of each T being open,
   a plug closely fitting within the bore of each said cross member and extending therewithin from one open end of said cross member,
   each said plug being of a length that the tip of the far end of said plug furthermost from said open end extends beyond the connection to said stem member when the plug is fully inserted,
   the portion of said plugs fitting within said cross members being formed from a cylinder with the far end terminating in said tip transversely severed and at least one of said plugs having the far end severed obliquely to the longitudinal axis of the plug such that a varying amount of wall surface of the plug is interposed in the connecting passage between said cross member and said stem member dependent upon the rotative position of the plug for varying the flow from said feed pipe through said T,
   each said plug being circumscribed with an annular sealing means to prevent leakage past said plug and out said one open T end while permitting rotation of said plug with the cross member,
   and means engaging said plugs and T's for positively retaining said plugs in the fully inserted position.

2. The device of claim 1 wherein the far end portion of said one plug is severed in an oblique flat plane which extends across the entire bore diameter of said stem member at the connection to said cross member.

3. The device of claim 2 wherein the bore of said stem member is substantially the same diameter as that of said cross member and said oblique flat plane forms an angle of approximately 30° with the longitudinal axis of said plug.

4. The device of claim 2 wherein the plug portion immediately adjacent said open end of said cross member has a circumferential groove,
   the wall of said cross member immediately adjacent said open end is pierced by a hole transversely of said cross member and aligned with a segment of said plug groove when the plug is in the fully inserted position,
   and said plug retaining means comprises a rod insertable through each said hole into locking engagement with a segment of said plug groove when the plug is in the fully inserted position.

5. The device of claim 4 wherein said cross members are in juxtaposition in a line parallel to said feed pipe with said holes in said cross members being in alignment, and said plug retaining means is a single rod having a straight portion insertable through the holes of all said cross members.

6. The device of claim 5 wherein one end of said single rod is formed into a curved segment.

7. The device of claim 4 wherein that portion of said plug lying outside said cross member open end is larger in diameter than the bore of said cross member and has recesses extending partially inwardly from both sides and at least partially across the diameter in an established alignment with any transverse oblique end plane on the innermost end of the plug.

8. The device of claim 4 wherein said sealing means comprises an annular sealing ring fitting within a groove circumscribing the cylindrical portion of said plug at a location not in registration with the connecting passage between said stem and cross members when the plug is fully inserted.

References Cited

UNITED STATES PATENTS

| | | | |
|---|---|---|---|
| 1,567,389 | 12/1925 | Rubly | 251—310 |
| 1,756,830 | 4/1930 | Marshall | 137—561 XR |
| 1,898,577 | 2/1933 | Ford | 251—310 |
| 2,702,590 | 2/1955 | Stillman | 137—561 XR |
| 3,196,809 | 7/1965 | Nelson et al. | 107—1.4 |

WALTER A. SCHEEL, *Primary Examiner.*

R. L. SMITH, *Assistant Examiner.*

U.S. Cl. X.R.

107—28; 251—209